United States Patent [19]

Moon et al.

[11] Patent Number: 6,085,098
[45] Date of Patent: Jul. 4, 2000

[54] APPARATUS AND METHOD FOR AUTOMATICALLY CONFIGURING SETTINGS OF A SOFTWARE APPLICATION IN A PORTABLE INTELLIGENT COMMUNICATIONS DEVICE

[75] Inventors: Billy G. Moon, Apex; Manon Baratt, Cary, both of N.C.

[73] Assignee: Ericsson Inc., Research Triangle Park, N.C.

[21] Appl. No.: 08/955,974

[22] Filed: Oct. 22, 1997

[51] Int. Cl.$^7$ ...................................... H04Q 7/20
[52] U.S. Cl. ........................ 455/457; 455/456; 455/556
[58] Field of Search .................... 455/456, 457, 455/556, 575, 550; 379/127, 245; 342/385

[56] References Cited

U.S. PATENT DOCUMENTS

| | | | |
|---|---|---|---|
| 5,341,414 | 8/1994 | Popke | 379/142 |
| 5,444,450 | 8/1995 | Olds et al. | 342/357.02 |
| 5,528,248 | 6/1996 | Steiner et al. | 342/357 |
| 5,546,445 | 8/1996 | Dennison et al. | 455/408 |
| 5,635,940 | 6/1997 | Hickman et al. | 342/385 |
| 5,646,839 | 7/1997 | Katz | 379/142 |
| 5,832,072 | 11/1998 | Rozenblit | 379/246 |
| 5,848,373 | 12/1998 | DeLorme et al. | 701/200 |

FOREIGN PATENT DOCUMENTS

| | | |
|---|---|---|
| 0 731 621 A2 | 9/1996 | European Pat. Off. . |
| 0 745 867 A1 | 12/1996 | European Pat. Off. . |
| 0 801 342 A2 | 10/1997 | European Pat. Off. . |
| 06291868 | 10/1994 | Japan . |

OTHER PUBLICATIONS

"Simon, Mobile Communications Made Simple", Bell-South, pp. 1–17, 1993.

*Primary Examiner*—Dwayne D. Bost
*Assistant Examiner*—Sonny Trinh
*Attorney, Agent, or Firm*—Davidson & Gribbell, LLP

[57] ABSTRACT

An apparatus and method for automatically configuring settings for a software application in a portable intelligent communications device, where the software application settings are dependent on certain geographical location information. The method includes the steps of determining a current geographical location for the portable intelligent communications device or setting a default location therefor, determining a geographical location for a party with whom the portable intelligent communications device is currently having an active voice conversation or with whom the portable intelligent communications device most recently had an active voice conversation, and integrating the geographical location information determined to automatically configure the settings of the software application.

23 Claims, 5 Drawing Sheets

APPARATUS AND METHOD FOR AUTOMATICALLY CONFIGURING SETTINGS OF A SOFTWARE APPLICATION IN A PORTABLE INTELLIGENT COMMUNICATIONS DEVICE

BACKGROUND OF THE INVENTION

1. Field of the Invention

The present invention relates generally to a portable intelligent communications device and, more particularly, to an apparatus and method for automatically configuring settings for a software application in such portable intelligent communications device from certain location information.

2. Description of Related Art

A new class of communication devices has been developed which includes a full computer integrated with the communications hardware and software. These devices, known as portable intelligent communications devices, differ significantly from personal digital assistants (PDAs) and handheld personal computers (HPCs) in that they are designed extensively to be a communications device rather than merely a "mobile computer." As such, the top features for the communications device are telephony, enhanced telephony, messaging, and information services. In order to enable at least some of these features, the portable intelligent communications device is able to be connected to the Internet by either a wired link or a wireless link. It will also be understood that certain software applications are provided within the portable intelligent communications device which facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

It will be seen that the portable intelligent communications device of the present invention has been designed with an interactive touch display screen which is fairly small in nature. By comparison, the display screen of these portable intelligent communications devices are smaller than monitors for personal and portable computers (approximately eight inches measure diagonally across). Because of the limited size of the display screen and the fact that a user's finger is generally used for the pointing device thereon, some limitations exist as to how quickly the settings for any software application therein can be configured and changed. Thus, whenever possible, it would be desirable for such software application settings to be automatically configured while giving the user flexibility to make changes as necessary. In this way, at least some of the tediousness involved with configuring the software application can be eliminated.

Accordingly, it is a primary object of the present invention to provide an apparatus and method for providing a portable intelligent communications device in which software applications may function.

It is another object of the present invention to provide an apparatus and method for connecting a portable intelligent communications device to the Internet so as to provide software applications functioning therein access to certain information.

It is still another object of the present invention to provide an apparatus and method for automatically configuring settings for software applications in a portable intelligent communications device.

Yet another object of the present invention is to provide an apparatus and method for automatically configuring settings for software applications in a portable intelligent communications device from certain location information.

These objects and other features of the present invention will become more readily apparent upon reference to the following description when taken in conjunction with the following drawings.

SUMMARY OF THE INVENTION

In accordance with a first aspect of the present invention, a method of automatically configuring settings for a software application in a portable intelligent communications device is disclosed, where the software application settings are dependent on certain geographical location information. This method includes the steps of determining a current geographical location for the portable intelligent communications device or setting a default location therefor, determining a geographical location for a party with whom the portable intelligent communications device is currently having an active voice conversation or with whom the portable intelligent communications device most recently had an active voice conversation, and integrating the geographical location information determined to automatically configure the settings of the software application.

In accordance with a second aspect of the present invention, a portable intelligent communications device is disclosed as including circuitry for performing telephony operations, a processing circuit, and at least one software application integrated in the portable intelligent communications device having a plurality of settings. The processing circuit automatically configures the settings for the software application by integrating certain geographical location information, particularly the geographical location of the portable intelligent communications device or a default location therefor, and the geographical location of a party with whom the portable intelligent communications device is currently having an active voice conversation or with whom the portable intelligent communications device most recently had an active voice conversation.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
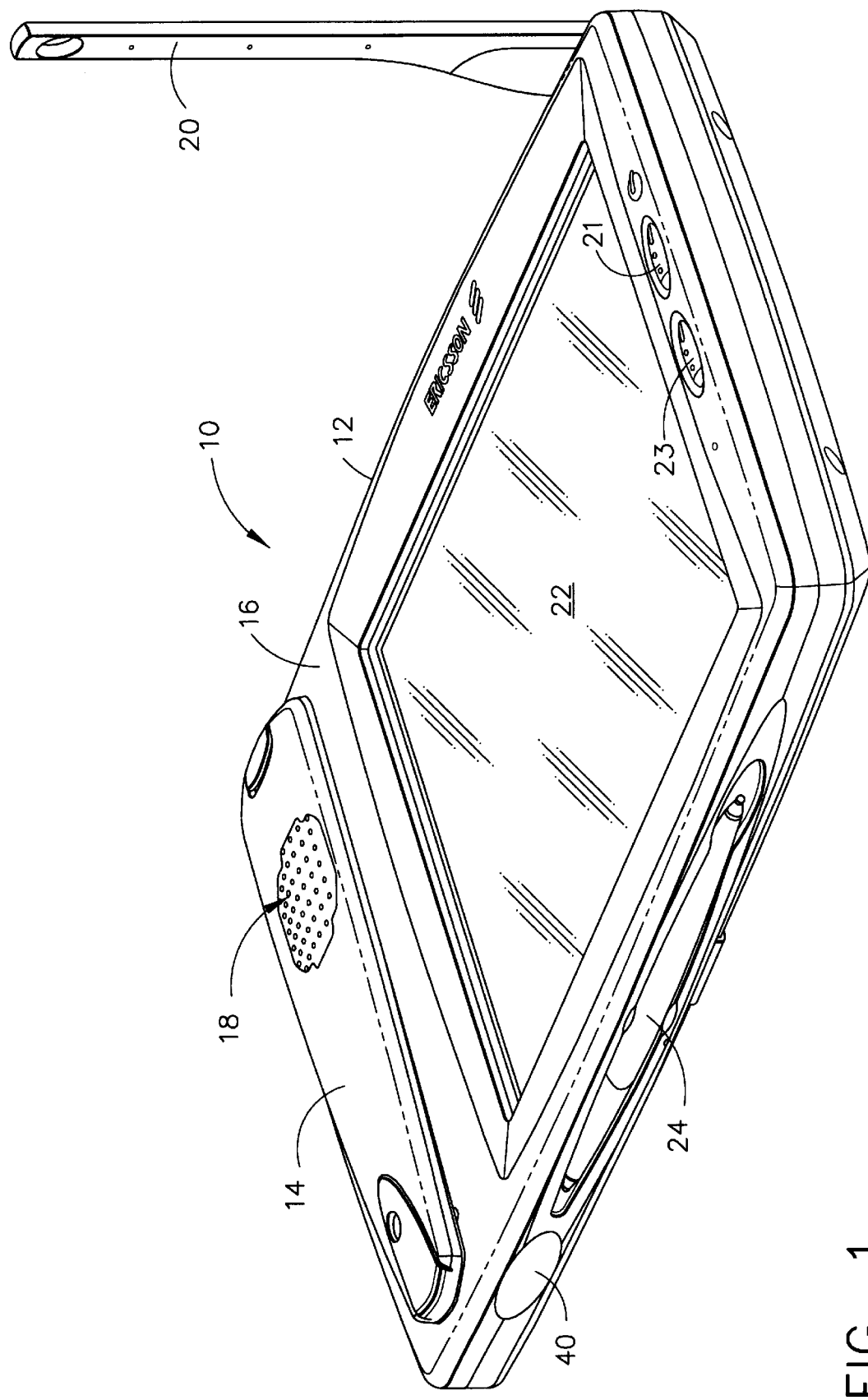
FIG. 1 is a perspective view of a portable intelligent communications device having the ability to run a plurality of software applications in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software, as well as obtain information via connection to an Internet address. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable a communications function, as when portable intelligent communications device 10 is in a cellular mode of operation. It will be understood that various ports, jacks, and interfaces will be provided to further enable communications functions by portable intelligent communications device 10. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
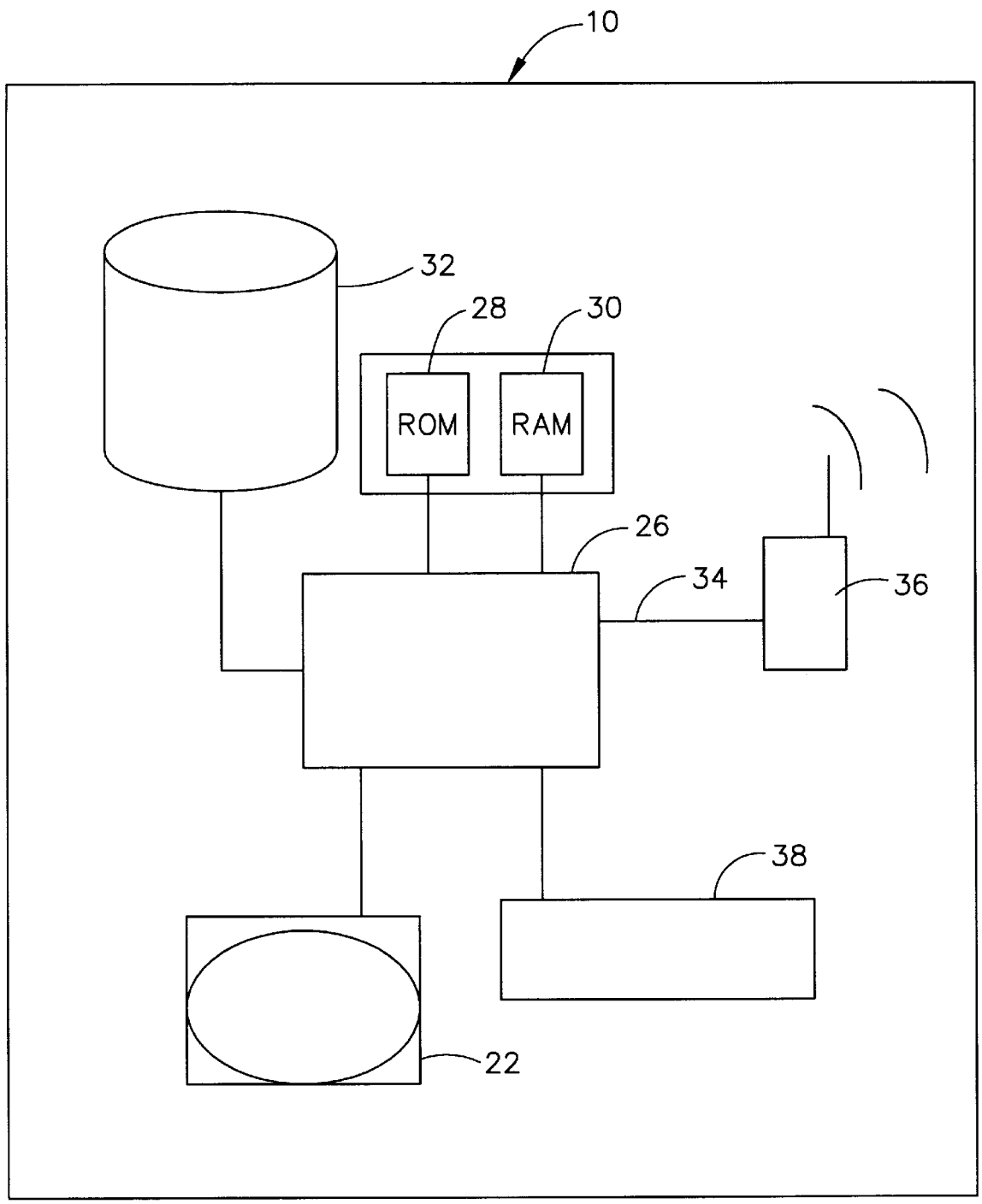
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be connected to processing circuit 26, where keyboard 38 can be depicted on display screen 22 or be a separate physical package which can be utilized with portable intelligent communications device 10 such as through a keyboard IR port 40 (see FIG. 1).

Figure 3:
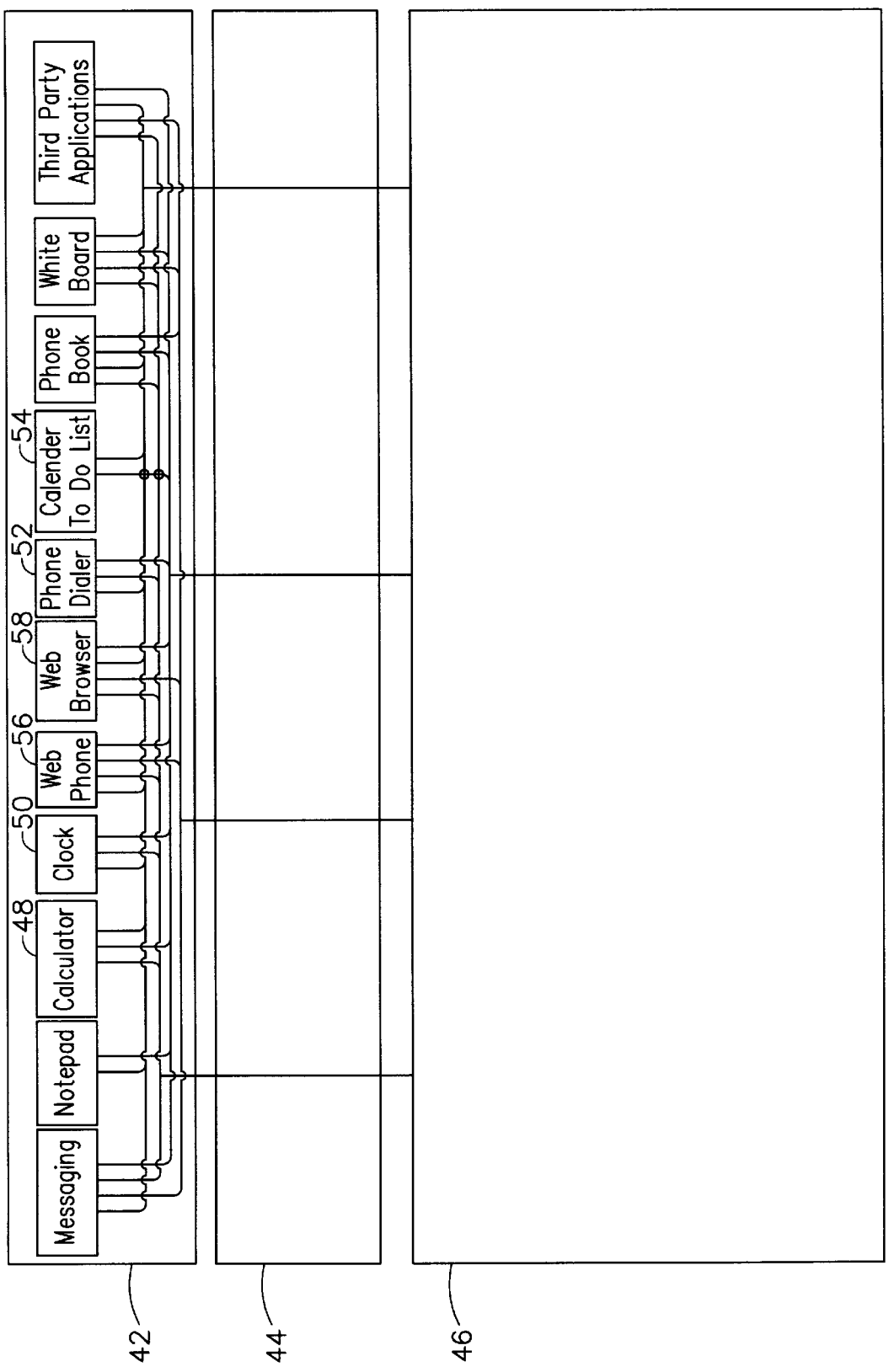
FIG. 3 is a block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 42, desktop software 44, and system operating software 46 (which includes everything else from the class libraries down to the device drivers for portable intelligent communications device 10). It will be understood that neither applications software 42 nor desktop software 44 will ever interact with anything other than the top layer of system operating software 46. Exemplary software applications are shown within applications software 42, with particular reference being made to calculator software application 48, clock software application 50, phone dialer software application 52, calendar/to do list software application 54, web phone software application 56, and web browser software application 58 in light of the present invention.

It will be appreciated that certain software applications have a plurality of settings which generally require configuration with regard to certain information. This is particularly true with respect to the need for certain geographical location information for calculator software application 48 which includes currency conversion and language translator features, as well as clock software application 50 which includes a dual time zone feature.

Figure 4:
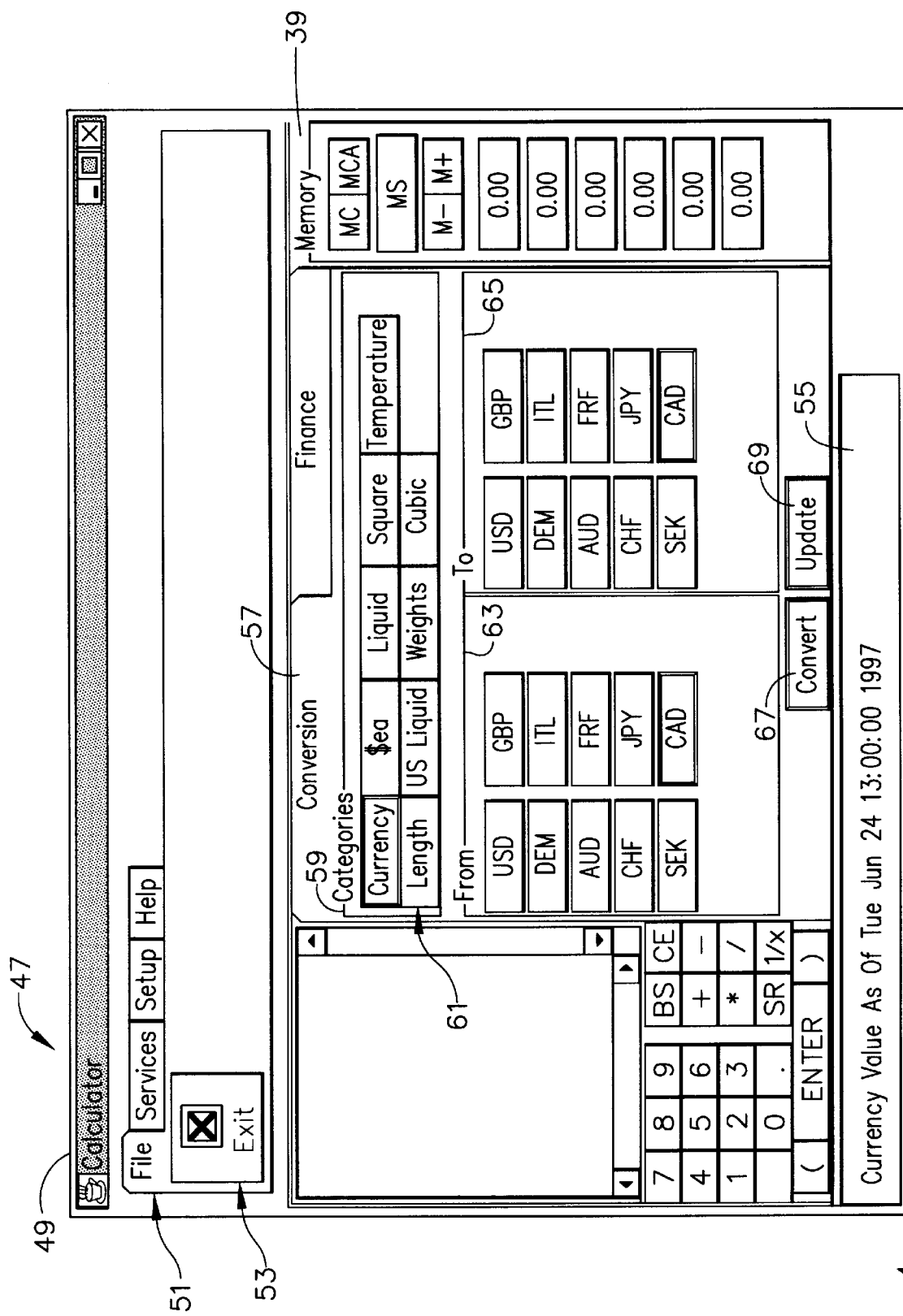
FIG. 4 is a screen display for a calculator software application operated by the portable intelligent communications device of FIGS. 1–3.

To better demonstrate the need for configuring settings depending on geographical location information, FIG. 4 depicts a screen display 47 for calculator software application 48. It will be noted that screen display 47 includes a title bar 49 located in a top window, as well as standard control buttons located along the right-hand side of title bar 49. A main control panel 51 is shown as including a plurality of tabbed areas, from which a second level of menu choices or control buttons (identified by the numeral 53), appear after selection of one of the tabs in main control panel 51. A bottom rectangular area 55 of screen display 47 is preferably used to display status information, such as the last time certain information was updated.

As further seen therein, a conversion file 57 is provided within a work area 39 in screen display 47 which includes a "Categories" area 59 containing a plurality of buttons 61 for activating a particular type of unit (e.g., currency, sea, liquid, square, temperature, length, US liquid, weights, and cubic). It will be noted that separate "From" and "To" windows 63 and 65 are included, within which a plurality of buttons representative of various countries are located. Since it will oftentimes be desirable for a user of portable intelligent communications device 10 to obtain information regarding the conversion of a given unit in one country to a comparable unit in a second country, activation of a "Convert" button 67 provides such information for the countries indicated. Alternatively, an "Update" button 69 may be actuated to update a conversion for units which change constantly (e.g., currency).

Such geographical location information is also required for phone dialer software application 52, which includes a feature that determines whether to initiate a call to a designated recipient depending upon the local time therefor as disclosed and shown in a patent application entitled "Apparatus And Method Of Automatically Handling Initiation Of A Call By A Portable Intelligent Communications Device," concurrently filed herewith and having Ser. No. 08/955,974, which is also owned by the assignee of the present invention and is hereby incorporated by reference. This type of geographical information is further utilized by calendar/to do list software application 54 in order to facilitate scheduling of appointments and meetings, as evidenced in a patent application entitled "Apparatus and Method for Highlighting Holidays of a Specified Location in a Calendar Software Application," concurrently filed herewith and having Ser. No. 08/965,002, which is owned by the assignee of the present invention and is hereby incorporated by reference.

Figure 5:
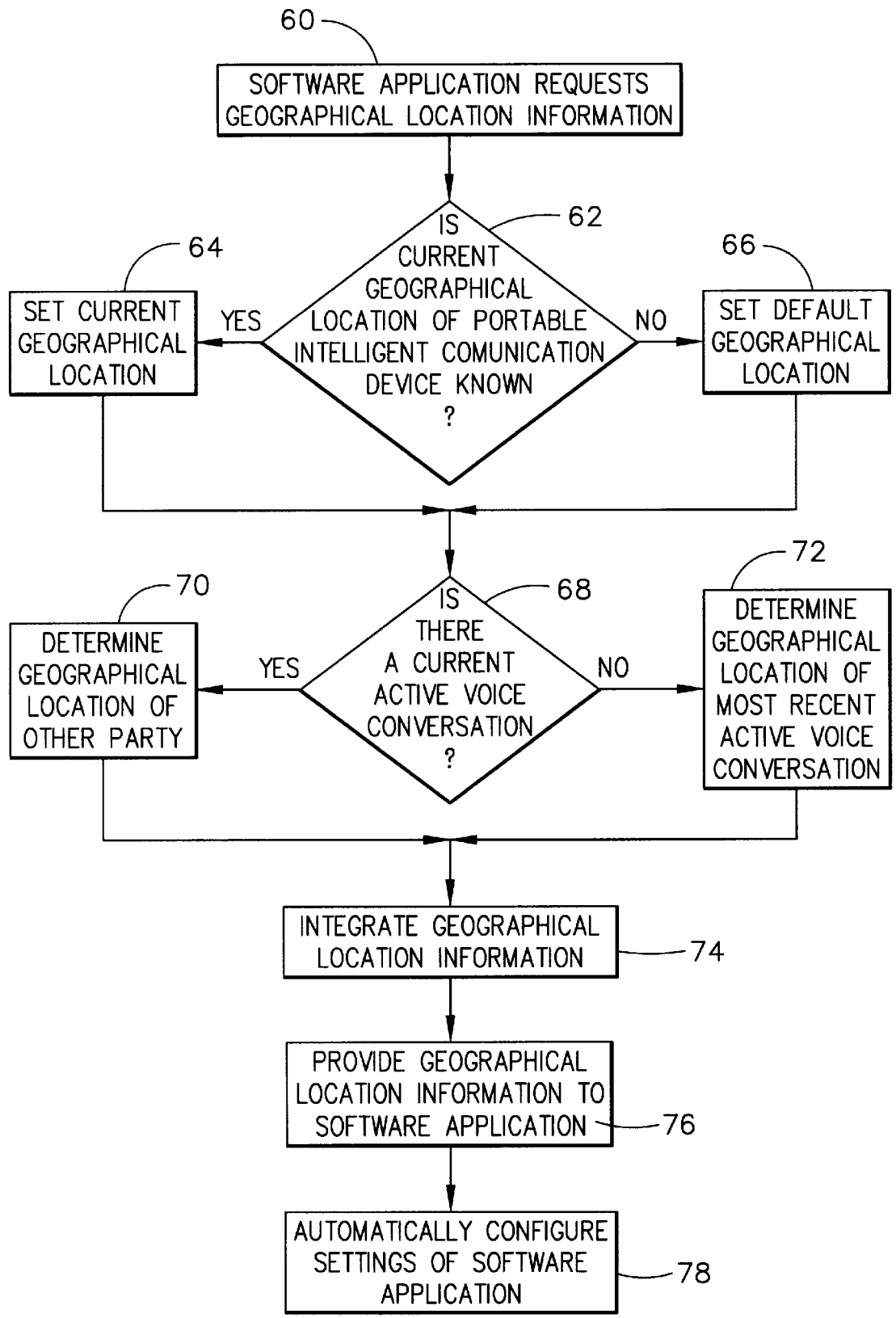
FIG. 5 is a flow diagram of the steps by which the method of the present invention is accomplished.

In order to reduce the amount of manual configuring required for such software applications, especially given the inherent limitations which exist for how quickly this can be accomplished due to the size of display screen 22 and keyboard 38 which may be depicted thereon, the present invention automatically configures the settings for software applications which are dependent upon certain geographical information. More specifically, this involves integrating geographical location information for portable intelligent communications device 10 and usage context information of portable intelligent communications device as illustrated in the flow chart of FIG. 5.

It will be recognized that the process begins by a software application requesting certain geographical information (box 60), such as the conversion feature of calculator software application 48 discussed above. Next, processing circuit 26 determines whether the current geographical location of portable intelligent communications terminal 10 is known (decision box 62). If the determination is positive, then the current location of portable intelligent communications device 10 is set (box 64); otherwise, a "Home" or default geographical location for portable intelligent communications device 10 is utilized (box 66). The current geographical location of portable intelligent communications device 10 may be determined in any one of several ways, including from a global positioning satellite (GPS) or mapping a particular cell site utilized by portable intelligent communications device 10 to a particular geographical location as known in the art.

Another manner of determining the current geographical location of portable intelligent communications device 10 is to examine a forward control channel utilized by portable intelligent communications device for sending call information to a switch. From the data obtained by a sample of such call information, a typical area code for portable intelligent communications device 10 is then determined. The current geographical location of portable intelligent communications device 10 is then easily associated with the typical area code as by comparing it to a database of such information.

With respect to the context usage of portable intelligent communications device 10, this involves determining whether portable intelligent communications device 10 is currently engaged in an active voice conversation (decision box 68). It will be understood that the term "conversation" includes voice, data, white board, and all other forms of communication by portable intelligent communications device 10, whether by landline, wireless, or other telephony circuitry. If the answer is yes, then the geographical location of the other party with whom portable intelligent communications device 10 is having the conversation is determined (box 70). If no conversation is currently taking place, a location for the party with whom portable intelligent communications device 10 had its most recent conversation is determined (box 72). After each conversation, this information is stored in a history log having a last in first out (LIFO) orientation.

After the geographical location information for portable intelligent communications device 10 and the usage context therefor is integrated (box 74) and provided to the software application (box 76), the settings of such software application are then automatically configured (box 78). These steps are accomplished through processing circuit 26. In accordance with the settings configured, the software application may then obtain information from a database in bulk storage device 32 and/or through an Internet address via a specialized information server as shown and disclosed in a patent application entitled "Method And Apparatus For Updating Data Bases," Ser. No. 08/955,911, which is also owned by the assignee of the present invention and is hereby incorporated by reference. Insofar as determining the current location of portable intelligent communications device 10 is concerned, processing circuit 26 will typically interface with communications circuitry 36.

Having shown and described the preferred embodiment of the present invention, further adaptations of the apparatus and method for automatically configuring settings of a software application in a portable intelligent communications device can be accomplished by appropriate modifications by one of ordinary skill in the art without departing from the scope of the invention. In particular, it will be understood that in the case where the automatic settings of such software application are not desired, the user of portable intelligent communications device 10 will be able to manually override and reconfigure the settings through appropriate prompts and/or screen displays.

What is claimed is:

1. A method of automatically configuring settings for a software application in a portable intelligent communications device, wherein said software application settings are dependent on certain geographical location information, said method comprising the following steps:
  (a) determining a first geographical location representative of said portable intelligent communications device;
  (b) determining a second geographical location representative of a usage context for said portable intelligent communications device; and
  (c) integrating said geographical location information determined in steps (a) and (b) to automatically configure said software application settings.

2. The method of claim 1, wherein said first geographical location is a current location of said portable intelligent communications device.

3. The method of claim 2, wherein said first geographical location of said portable intelligent communications device is determined from a global positioning satellite.

4. The method of claim 2, wherein said first geographical location of said portable intelligent communications device is determined by mapping a particular cell site utilized by said portable intelligent communications device to a particular geographical location.

5. The method of claim 2, wherein said first geographical location of said portable intelligent communications device is determined by the following steps:
   (a) examining a forward control channel utilized by said portable intelligent communications device for sending call information to a switch;
   (b) determining a typical area code for said portable intelligent communications device from a sample of said call information sent to said switch; and
   (c) determining from said typical area code a geographical location for said portable intelligent communications device.

6. The method of claim 1, wherein said first geographical location is a home location for said portable intelligent communications device.

7. The method of claim 1, wherein the usage context is the geographical location of a party with whom said portable intelligent communications device is currently engaged in a conversation.

8. The method of claim 1, wherein the usage context is the geographical location of a party with whom said portable intelligent communications device most recently engaged in a conversation.

9. The method of claim 1, wherein said software application is a calculator having a unit conversion feature.

10. The method of claim 1, wherein said software application is a calculator having a language translator feature.

11. The method of claim 1, wherein said software application is a dual time zone clock.

12. The method of claim 1, wherein said software application is a phone dialer.

13. The method of claim 1, wherein said software application is a calendar.

14. The method of claim 1, further comprising the step of said software application requesting said geographical location information of steps (a) and (b).

15. A portable intelligent communications device, comprising:
   (a) circuitry for performing telephony operations;
   (b) a processing circuit; and
   (c) at least one software application operated by said portable intelligent communications device having a plurality of settings;
wherein said processing circuit automatically configures the settings for said software application by integrating a first geographical location representative of said portable intelligent communications device and a second geographical location representative of a usage context for said portable intelligent communications device.

16. The portable intelligent communications device of claim 15, said first geographical location comprising a current geographical location of said portable intelligent communications device.

17. The portable intelligent communications device of claim 15, said first geographical location comprising a home geographical location for said portable intelligent communications device.

18. The portable intelligent communications device of claim 15, said second geographical location comprising the geographical location of a party with whom said portable intelligent communications device is currently having a conversation.

19. The portable intelligent communications device of claim 15, said second geographical location comprising the geographical location of a party with whom said portable intelligent communications device most recently had a conversation.

20. The portable intelligent communications device of claim 16, wherein said processing circuit determines said current geographical location of said portable intelligent communications device via a global positioning satellite.

21. The portable intelligent communications device of claim 16, wherein said processing circuit determines said current geographical location of said portable intelligent communications device by mapping a particular cell site utilized by said portable intelligent communications device.

22. The portable intelligent communications device of claim 16, wherein said processing circuit determines said current geographical location of said portable intelligent communications device by determining a typical area code for said portable intelligent communications device from a sample of call information sent to a switch.

23. The portable intelligent communications device of claim 19, wherein said processing circuit obtains the geographical location of said most recent active voice conversation from a history log having a last in first out (LIFO) orientation.

* * * * *

UNITED STATES PATENT AND TRADEMARK OFFICE
CERTIFICATE OF CORRECTION

PATENT NO.     : 6,085,098
DATED          : July 4, 2000
INVENTOR(S)    : Billy G. Moon and Manon Baratt It is certified that error appears in the above-identified patent and that said Letters Patent is hereby corrected as shown below:

Column 1,
Lines 35-36, change from "a patent application" to -- Patent Publication No. WO0007345 --.
Lines 37-38, change from "and having Ser. No. 08/796,119," to -- filed on July 28, 1998, and --.

Column 3,
Lines 22-23, change from "a patent application" to -- Patent Publication No. WO0007345 --.
Line 24, change from "and having Ser. No. 08/796,119," to -- filed on July 28, 1998, and --.

Column 5,
Line 10, change from "a patent application" to -- U.S. Patent No. 6,075,992 --.
Line 13, change from "concurrently filed herewith and having Ser. No. 08/995,974," to -- filed on October 22, 1997, and --.
Lines 18-19, change from "a patent application" to -- U.S. Patent No. 6,064,975 --.
Lines 21-22, change from "concurrently filed herewith and having Ser. No. 08/965,002," to -- filed on October 22, 1997, and --.

Column 6,
Lines 23-24, change from "a patent application" to -- Patent Publicaton No. WO9923580 --.
Line 25, change from "Ser. No. 08/955,911," to -- filed on October 14, 1998, and --

Signed and Sealed this

Twenty-fourth Day of June, 2003

JAMES E. ROGAN
*Director of the United States Patent and Trademark Office*